Figure 1:
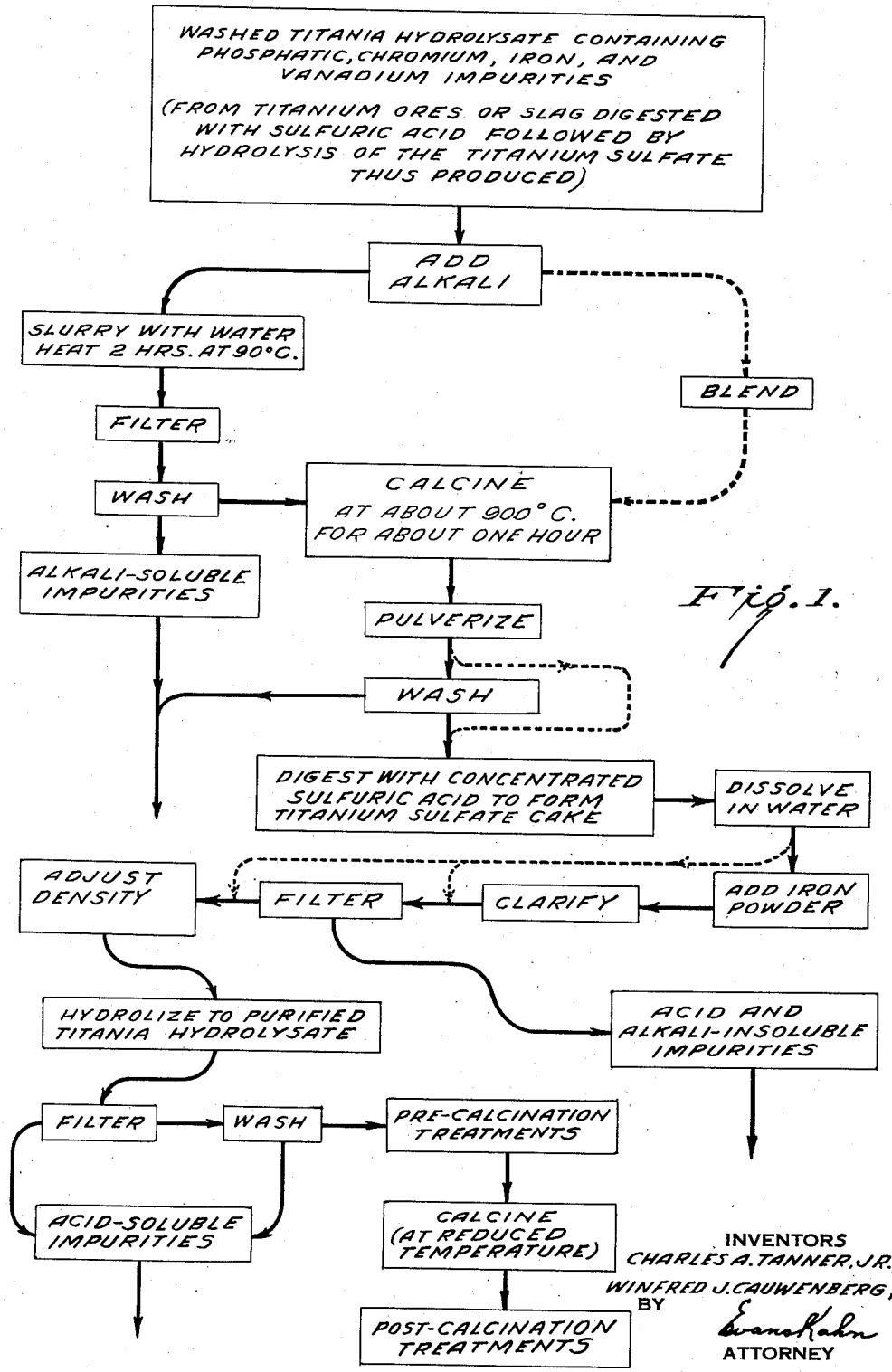

July 8, 1958 C. A. TANNER, JR., ET AL 2,842,428
PRODUCTION OF PURIFIED TITANIUM DIOXIDE PIGMENT
Filed June 1, 1951 2 Sheets-Sheet 1

INVENTORS
CHARLES A. TANNER, JR.,
WINFRED J. CAUWENBERG,
BY
ATTORNEY

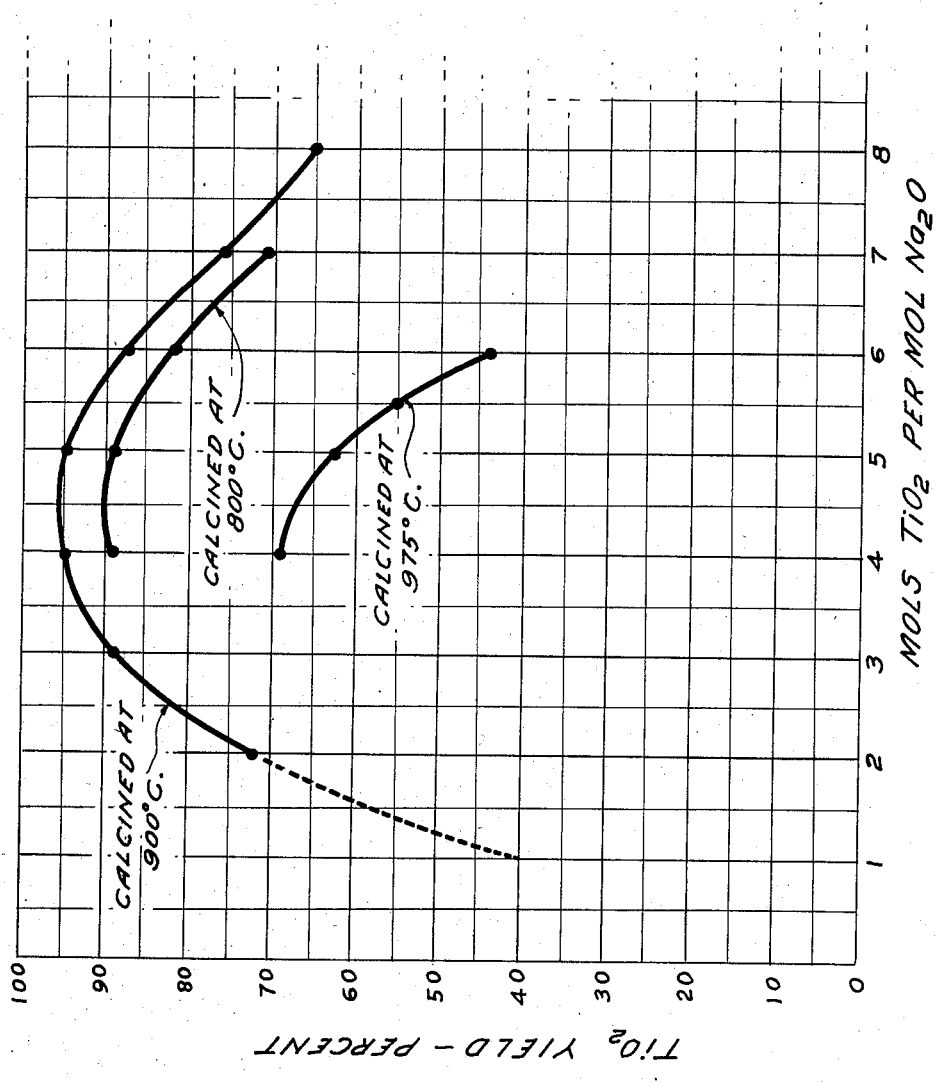

2,842,428
Patented July 8, 1958

2,842,428

PRODUCTION OF PURIFIED TITANIUM DIOXIDE PIGMENT

Charles A. Tanner, Jr., Moorestown, N. J., and Winfred J. Cauwenberg, Piney River, Va., assignors to American Cyanamid Company, New York, N. Y., a corporation of Maine Application June 1, 1951, Serial No. 229,481

13 Claims. (Cl. 23—202)

The present invention relates to the production of improved titanium dioxide pigments from a washed titania hydrolysate containing phosphatic, iron, vanadium and chromium impurities. More particularly, it relates to a method of producing a purified titanium hydrolysate substantially free from phosphatic impurities and of very low vanadium, chromium and iron content, and to the preparation of a rutile titanium dioxide pigment therefrom characterized by outstanding pigmentary properties including color, tint, tinting strength and oil absorption. Further, the present invention relates to novel stable solutions of titanium sulfate substantially free of heavy metals and to methods for the preparation thereof.

Titanium dioxide pigments are generally produced commercially by a process wherein a titaniferous ore, such as ilmenite or a high titanium content slag, is digested with concentrated sulfuric acid to convert the titanium content thereof to a crude cake containing titanium sulfate, which is thereafter dissolved in water to provide a liquor containing one or more sulfates of titanium, hereinafter called "titanium sulfate solution." Inevitably in this process this solution contains in dissolved form a group of metals including iron, vanadium, chromium and manganese, as well as a group of phosphatic impurities, which are derived from the ore. The solution is filtered to remove dispersed, non-soluble material, and is subjected to thermal hydrolysis to form titania hydrolysate which precipitates. The bulk of the above-mentioned impurities remain in soluble form, and are largely drawn off with the mother liquor. The hydrolysate which remains is then thoroughly washed, dried, and calcined to yield pigmentary titanium dioxide. From the chemical point of view the above process effects a practically complete elimination of the impurities. Nevertheless, sufficient proportions are occluded in or adsorbed by the hydrolysate as it precipitates to cause distinct coloration of the ultimate pigment.

The metallic group of impurities is primarily responsible for this coloration, but fortunately appears to have no further disadvantageous action. The effect of the phosphatic impurities, however, appears to be two-fold. In the first place, they cause an increase in the temperatures at which titania hydrolysate must be calcined before conversion of this material to a titanium dioxide pigment, either of the anatase or rutile form, can be effected. In the second place, although apparently colorless in themselves, they appear to act synergistically with the metallic group of impurities, increasing their capacity to cause discoloration of the pigment.

An object of the present invention, therefore, is to devise a simple, direct and economical process for producing a titania hydrolysate essentially free from phosphatic impurities and of sharply reduced content of the color-forming metallic group of impurities. A further object of the present invention is to effect these improvements by the use of only cheap, industrial chemicals, in ordinary chemical equipment of the type already employed for the manufacture of titanium dioxide pigment.

The above-described objects have been attained by the process of the present invention which effects substantially complete removal of the above-noted impurities in a simple, direct and highly economical manner with excellent yields. The hydrolysate obtained typically has vanadium and chromium contents of about 0.001% or even less, a similarly reduced iron content, and a phosphorus content of about 0.01%, all on a $TiO_2$ basis. From this highly purified hydrolysate, titanium dioxide pigments of unexcelled brilliance are readily prepared. The invention could not have been predicted because up to the present it has not been thought possible to prepare iron-free solutions of titanium sulfate which are stable and which can be filtered and hydrolyzed to titania hydrolysate in nearly quantitative yields.

Briefly, the overall process comprises reacting a washed titania hydrolysate comprising alkali-soluble and acid-soluble color-forming impurities with a caustic; forming an insoluble metal titanate and solubilizing the alkali-soluble impurities; washing these solubilized impurities from the metal titanate; calcining the titanate at a temperature sufficiently high to complete the reaction of the caustic and insufficiently high to form anatase; digesting the metal titanate with concentrated sulfuric acid and solubilizing the acid-soluble impurities; forming a solution of titanium sulfate from the cake; filtering the titanium sulfate solution and separating any impurities present which were neither alkali nor acid-soluble; hydrolyzing the titanium sulfate solution to titania hydrolysate which precipitates; filtering and washing the hydrolysate to separate the acid-soluble impurities; and calcining the pure titania hydrolysate thus obtained to titanium dioxide pigment.

It will be understood that the washed titania hydrolysate referred to as the raw material of the present process is in itself a very pure material, as is well known in the art, and that the total amount of phosphatic and metallic impurities associated therewith is less than about 1% by weight calculated on the $TiO_2$ equivalent of the hydrolysate.

The procedure of the present invention is described more in detail with reference to the drawings, in which:

Figure 1 is a flowsheet of a process according to the present invention, illustrating a number of alternatives; and Figure 2 illustrates the yields of titanium sulfate as $TiO_2$ obtained by calcining for one hour at the temperatures stated a series of sodium titanates prepared from titania hydrolysate by reacting these titanates with 70% of the amount of 85% sulfuric acid necessary to convert the respective titanates to $Ti(SO_4)_2$, and dissolving the reaction product in water to give a liquor of 1.45 specific gravity, all according to the process of the present invention.

For convenience, the drawings will be discussed in terms of the utilization of sodium hydroxide as the alkali, but it will be understood that the process is not so limited and other hydroxides as well as oxides may be used, including potassium hydroxide, calcium hydroxide and calcium oxide, together with their carbonates and bicarbonates, all of which are hereinafter referred to as "alkalis."

As shown in Figure 1, the washed titania hydrolysate of commerce is contemplated as the raw material of the present process. This material is produced by the digestion of a titanium bearing ore with concentrated sulfuric acid to yield a crude solution comprising titanium sulfate and numerous impurities notably iron as ferrous sulfate. After one or more preliminary purification steps the titanium content of this solution is precipitated by hydrolysis of the titanium sulfate to titania hydrolysate, and the bulk of the remaining impurities, which remain in solution, are removed by filtration. Significant proportions of these impurities remain, however, and are adsorbed on and/or occluded by the titania hydrolysate. As titania hydrolysate exhibits pronounced surface activity, only a portion of these entrained impurities can be removed by the intensive washing of the hydrolysate which follows. As shown by the solid lines in the figure, an aqueous slurry of this washed titania hydrolysate is heated with sufficient sodium hydroxide to form a sodium titanate, and to solubilize substantially all of the alkali-soluble group of impurities. Ordinarily, heating for two hours at about 90° C. is preferred, although less time is frequently sufficient. At this point the product is washed to remove the alkali-soluble impurities. Alternatively, as shown by dotted lines in Figure 1, the titania hydrolysate may be blended with caustic. In either event, the product is calcined for a time and at a temperature sufficiently high to ensure substantially complete reaction of all the sodium hydroxide, but insufficient to form rutile or anatase, as these structures are essentially inert to the treatments which follow and reduce the over-all yield of the process. Ordinarily a calcination at about 900° C. for one hour is sufficient. The product from the calcination is somewhat sintered and therefore is pulverized. Preferably it is washed as well, although this step may be omitted if the first described procedure has been followed, as shown by the solid lines.

The proportions of sodium hydroxide employed for the reaction are of some interest. This proportion is not critical, and varies from that sufficient to form the equivalent of $Na_2O.TiO_2$ or $CaO.TiO_2$ to that sufficient to form the equivalent of $Na_2O.8TiO_2$ or $CaO.8TiO_2$. In other words, the molar equivalence ratio of the hydrolysate as $TiO_2$ to the alkali is between about 1:1 and 8:1. An excess of caustic is advisable, depending on the procedure followed. In the first procedure, wherein the hydrolysate and alkali are slurried with water, not all of the alkali reacts and the excess is necessary to compensate for that lost in the washing which follows. In practice, when this procedure is employed, about 1½ to 2 parts of caustic per part of hydrolysate ($TiO_2$ basis) give the desired end results. When the dry blend method is employed, shown in dotted lines on Fig. 1, no such large excess is necessary because the washing follows the calcination step. In either event, any unreacted hydrolysate with its burden of contaminants is filtered from the titanium sulfate solution which is later formed. As is shown in Figure 2, optimum yields of titanium sulfate at digestion, expressed as $TiO_2$, are secured when the proportions of caustic are sufficient to yield titanates embraced within the limits $Na_2O.3TiO_2$ and $Na_2O.5TiO_2$. Where the ratio of NaOH used to the $TiO_2$ equivalent in the hydrolysate is less than about 1:1 by weight, it will generally be found preferable to blend the materials together and calcine the mixture directly, as shown by the dotted lines, as the wet reaction at 90° C. is then unduly slow. This is particularly true where CaO is employed as the alkali.

Experimentation has shown that where the proportions of caustic soda and hydrolysate ($TiO_2$ equivalent) are varied between limits which should be productive of titanates ranging from $Na_2O.TiO_2$ to $Na_2O.8TiO_2$ and the mixtures are calcined as described, the products, upon analysis by X-ray diffraction methods, appear to be $Na_2O.TiO_2$, $Na_2O.3TiO_2$, $Na_2O.5TiO_2$, or mixtures thereof. Any of these several metal titanates, and mixtures thereof, may be employed in the process of the present invention.

As is further shown in Figure 1, the calcined, pulverized sodium titanate is digested with sufficient concentrated sulfuric acid to yield a titanium sulfate cake. Ordinarily in this step the titanate is mixed with sufficient 85% sulfuric acid calculated to give a titanium sulfate solution of from about zero to 30 basicity factor at 100% $TiO_2$ recovery, that is with 70% to 100% of the theoretical amount of $H_2SO_4$ calculated as necessary to form $Ti(SO_4)_2$. An intermediate amount (80% or 85% of the theoretical) is preferred. The strength of the acid is not critical, but when the $Na_2O.TiO_2$ ratio approaches 1:1, use of a more dilute acid for example 30%–60% sulfuric acid, gives much better yields. The amount of 85% acid varies from 195 g. per 100 g. of $Na_2O.TiO_2$ to 201 g. per 100 g. of $Na_2O.8TiO_2$ and yields solution of about 30% basicity. The mixture is cautiously heated up to about 170° C. until the reaction is substantially complete, and the cake thus obtained is baked for about two hours at that temperature. With further reference to Figure 1, the cake is dissolved in sufficient water to give a titanium sulfate solution having a density of about 1.45 at 56° C. When the preferred procedures have been followed the yield of titanium sulfate ($TiO_2$ basis) in this solution is about 95%, as is shown in Figure 2.

It is an advantage of the present invention that the titanium sulfate solution thus obtained can be processed in a broadly conventional manner towards production of the desired pigment. As shown in the flow sheet, iron powder (about 0.2% based on the $TiO_2$ equivalent) may be added to reduce any ferric sulfate which may be present to ferrous sulfate. However, the sulfate solution ordinarily is practically completely iron-free, and this step is included in the flow sheet because it can cause no harm and is a safeguard against the presence of tramp iron or iron extracted from the equivalent. The filtration which follows eliminates any acid- and alkali-insoluble impurities present. The step of iron addition, together with the subsequent clarification and filtration steps, may be omitted as shown by the dotted lines.

The pure titanium sulfate solution, now substantially free of alkali-soluble and alkali- and acid-insoluble impurities is then hydrolyzed in the conventional way to titanium hydrolysate, which precipitates. The preferred method of hydrolysis is that disclosed in Blumenfeld U. S. Reissue 18,854 in which the liquor is concentrated to a density of about 1.75 and is added to hot water in quantities in the range from about 72 parts of liquor to 28 parts of water. The solution is then boiled until precipitation of titanium hydrolysate is substantially complete. Upon filtration the bulk of the residual acid-soluble impurities go off with the filtrate, and the washing step which follows substantially completes the purification. The titanium hydrolysate thus obtained is of the highest purity and yields a rutile pigment having a color superior to any now known. A typical hydrolysate prepared according to the above-described process contains on a $TiO_2$ basis about 0.01% phosphorus, and a total of about 0.002% other elements of which about 0.001% is sodium which is not harmful.

The precalcination treatments, referred to in Figure 1, may include the addition of conditioning and mineralizing agents, as well as the addition of rutile seed, for example, about 0.5–3%, where rutile, as distinguished from anatase pigment is desired. The addition of rutile seed permits complete conversion of the titania to rutile titanium dioxide at temperatures appreciably lower than those necessary where purification by the process of the present invention has not been performed. For example, both rutile and anatase $TiO_2$ may be prepared by calcination at temperatures in the range of 750–900° C.

The same general procedure is followed when calcium or magnesium hydroxide or oxide is employed. In the calcination to form calcium titanate a temperature of 1200°–1400° C. for about two hours is preferable, and the mixing of the calcination product with sulfuric acid in the digestion step should be done slowly and cautiously to avoid local overheating and the hazard of foaming. When a calcium alkali is used, the calcium sulfate formed during digestion is removed when the titanium sulfate solution is filtered, in distinction to the preferred process wherein sodium hydroxide is used and wherein the sodium sulfate is removed only when the final titania hydrolysate is filtered. The use of calcium alkalis therefore makes possible the production of a pure aqueous titanium sulfate solution.

As stated, it is a particular advantage of the present invention that ordinary chemical equipment can be used. Of course, in the acid digestion and subsequent hydrolysis steps, it is advantageous to use a glass- or lead-lined vessel which will not introduce impurities.

The tinting strength values of the titanium dioxide pigments obtained may be evaluated according to a modification of the method described in "Paints, Varnishes, Lacquers & Colors" (10th ed.) by Gardner, p. 44. Essentially, this testing method consists in evaluating the tinting strength of the titanium dioxide by a determination of the quantity of carbon black which must be compounded therewith to obtain a particular light reflectance value. The tinting strength value is then expressed as a number based on white lead as 100. When tested by this method, commercial grades of rutile $TiO_2$ pigment ordinarily have tinting strength values of from about 1500–1550 while anatase $TiO_2$ pigment possesses tinting strength values of about 1160–1270. The improved pigments prepared according to the method of this invention, possess tinting strength values ranging from 1580 to 1650 and even higher for rutile $TiO_2$ to about 1230 to 1350 for anatase. Other pigmentary characteristics of the products of the present invention are improved texture and resistance to chalking, low oil absorption, good compatibility with various coating vehicles, and outstanding brightness and color retention.

The invention has been set forth above, but will be more fully described by the following specific examples. It should be understood, therefore, that although these examples may describe in detail some of the specific features of the invention, they are given primarily for purposes of illustration and that the invention is not limited thereto.

*Example 1*

A washed titania hydrolysate was withdrawn from the commercial production of titanium dioxide pigment by the process wherein an ilmenite ore is subjected to a double froth flotation, the titanium concentrate therefrom is digested with sulfuric acid to form titanium sulfate, and the titanium sulfate thus obtained is hydrolyzed to titania hydrolysate. This hydrolysate contained ($TiO_2$ basis) 0.001% chromium as $Cr_2O_3$, 0.003% vanadium as $V_2O_5$, 0.05% iron as Fe, and 0.6% phosphorus as $P_2O_5$, and was heated with NaOH (1.5 parts by weight NaOH for each part of $TiO_2$ equivalent) for 2 hours at 90° C., after which the product was washed with water, calcined for one hour at 900° C. and pulverized. The product contained the analytical equivalent of 84% $TiO_2$ and 16% $Na_2O$. To 2381 g. of the sodium titanate thus prepared, containing the equivalent of 2000 g. of $TiO_2$, was added 4750 g. of 85% $H_2SO_4$. When the reaction subsided somewhat, the mixture was heated to about 185° C. in an iron pot until the reaction was complete. The reaction cake was allowed to bake for two hours at about 170° C., after which it was dissolved in water and the resulting liquor was adjusted to 1.45 sp. gr. at 56° C. The yield of soluble titanium as $TiO_2$ was 98%. The liquor was heated to 55° C., treated with 2 g. of powdered iron and agitated for 30 minutes. 2.0 g. of glue in the form of a 10% aqueous solution was added to the liquor which was thereafter filtered and concentrated under vacuum to 1.73 sp. gr. The concentrated liquor was clear and sparkling, was essentially free from phosphorus as $P_2O_5$ and had the following analysis: 19.8% soluble titanium as $TiO_2$, 0.2% $FeSO_4$, 38.8% $H_2SO_4$, and 8.2% $Na_2SO_4$. The concentration of titanium as $Ti_2(SO_4)_3$ was 0.60 g./l. and the basicity of the liquor was 20% as calculated from the formula $$100 \times \left(1 - \frac{\text{Percent free } H_2SO_4}{\text{Percent } TiO_2 \times 2.45}\right)$$

where "free $H_2SO_4$" is that available for combination with titanium, any acid combined with iron, etc. being subtracted from the total $H_2SO_4$ figure, and "$TiO_2$" is the $TiO_2$ equivalent of the titanium in the solution. The liquor was completely stable.

A portion of the above-described concentrated liquor was hydrolyzed by adding 74 parts of the liquor to 26 parts of water and boiling for three hours. During the boiling period water was added to maintain an acid concentration of 27% $H_2SO_4$. The yield following this hydrolysis was 97%, and the hydrolysate after washing with water contained less than 0.001% each of chromium and vanadium, 0.005% iron, and 0.01% phosphorus as $P_2O_5$, all on the $TiO_2$ basis. The hydrolysate was treated with conditioning agents and calcined. The calcined product was further processed to rutile pigment of excellent pigment quality, and outstanding in having a brightness of 106 as compared with the commercial rutile pigment prepared from the titania hydrolysate used of 90–93 brightness.

*Example 2*

A titanium sulfate liquor was prepared by digesting a sodium titanate prepared according to Example 1. The liquor was substantially identical to the liquor of Example 1, and had the following analysis: 19.6% $TiO_2$ equivalent, 0.3% $FeSO_4$, 38.3% $H_2SO_4$, and 8.1% $Na_2SO_4$. It contained 0.80 g./l. of $Ti_2(SO_4)_3$. This liquor was also hydrolyzed as in Example 1. The rutile seeds were omitted, and the only conditioning agent was 0.5% of $K_2CO_3$. The product was calcined and yielded an anatase pigment having a tinting strength of 1230 and a color value of 106 with a decidedly blue cast as compared with commercially available anatase pigment having a normal color value of 92–96. The product possessed excellent pigmentary characteristics.

*Example 3*

In Example 1, the stable sulfate liquor contained 0.2% iron, resulting from the use of an iron digestion pot, which was eliminated substantially completely by the treatments which followed. The fact that no iron at all is necessary for the stability of the sulfate solution or the preparation of high quality hydrolysate and pigment is demonstrated as follows.

Sodium titanate containing no iron was digested as in Example 1 employing a glass digestion tank to avoid iron contamination. The concentrated liquor was stable, and was substantially identical to the liquors of Examples 1 and 2. It had the following analysis: 19.5% $TiO_2$ equivalent, 39.0% $H_2SO_4$, 8.1% $Na_2SO_4$, no iron, 0.01% phosphatic and 0.001% color forming metals. This liquor was hydrolyzed as in Example 1 employing a liquor:water ratio of 72:28. The yield of hydrolysate was 98% which upon calcination yielded a rutile pigment of approximately the same characteristics as those possessed by the product of Example 1.

*Example 4*

The equivalent of 3000 g. of $TiO_2$ in the form of a water-washed titania hydrolysate corresponding to the hydrolysate of Example 1 was mixed with 749 g. of NaOH and the mixture was dried and calcined for one hour at 900° C. The calcined product contained 16% $Na_2O$ and 84% $TiO_2$ and was composed of a mixture of the two titanates $Na_2O.3TiO_2$ and $Na_2O.5TiO_2$. To 2000 g. of this titanate mixture was added 4000 g. of 85% $H_2SO_4$ and the mixture was heated until the reaction was complete. The digestion cake was dissolved in water and upon clarification resulted in a stable basic titanium sulfate liquor of the same characteristics as that of Example 1.

Example 5

The equivalent of 3000 g. of $TiO_2$ in the form of a water-washed titania hydrolysate was mixed with 600 g. of NaOH and the mixture was dried and calcined for one hour at 900° C. The calcined product contained 13.4% $Na_2O$ and 86.6% $TiO_2$ and was shown by X-ray analysis to be composed chiefly of $Na_2O.5TiO_2$ plus a few percent of rutile $TiO_2$. The product was digested with sulfuric acid as in Example 4 and gave a $TiO_2$ yield of 94.1%. The liquor prepared from this digestion was completely stable with a basicity factor of 16 and was entirely satisfactory in the preparation of excellent rutile and anatase pigments.

Example 6

Washed, calcined sodium titanate (84% $TiO_2$ and 16% $Na_2O$ equivalent) to which had been added the equivalent of 0.60% $P_2O_5$, based on the $TiO_2$ equivalent, was digested in commercial 85% $H_2SO_4$, following the procedure of Example 1. The liquor obtained following the digestion treatment was stable, and had the following analysis: 19.4% $TiO_2$, 0.2 $FeSO_4$, 39.1% $H_2SO_4$, 8.7% $Na_2SO_4$, 0.2% $FeSO_4$ and 0.61% $P_2O_5$ ($TiO_2$ basis), and less than 0.001% each of vanadium and chromium based on the $TiO_2$. The liquor was divided into portions. One portion of this liquor was hydrolyzed and the hydrolysate processed as in Example 1 except that the higher calcination temperature of 975° C. was employed due to $P_2O_5$. It yielded a rutile pigment having exceptionally good color and a tinting strength value of 1620.

Example 7

To the second portion of the liquor of Example 6 was added the equivalent of 0.76% $V_2O_5$ (based on the $TiO_2$) as $NH_4VO_3$ to increase the amount of vanadium to that present in the titanium sulfate liquor from which the sodium titanate of Example 6 had been prepared. The liquor was hydrolyzed and the hydrolysate processed to yield a rutile pigment all in the same manner as Example 6. However, this product was contaminated by vanadium and had a tinting strength of 1590 and was decidedly grey in color compared with the product of Example 6.

Example 8

The remaining portions of the liquors were processed in accordance with the procedure of Example 6, except that the $P_2O_5$ was replaced with varying amounts of chromate. It was found that more than about 0.001% of $Cr_2O_3$ in the hydrolysate ($TiO_2$) produced a pigment which was yellowish. In both of these experiments, it is to be noted that although the pigments produced had good tinting strength and were free of iron compounds, the presence of even small amounts of vanadium and chromium caused undesirable degradation in the color of the products. The presence of appreciable quantities of both phosphate and vanadium were very detrimental.

Example 9

A slurry of titanium hydrolysate equivalent to 100 g. of $TiO_2$ was mixed with a slurry containing 300 g. of lime of 90% purity as $Ca(OH)_2$. The product was heated for two hours at about 90° C. The dried material was then calcined at about 1250° C. for 2 hours, and pulverized, washed, and dried. X-ray diffraction analysis indicated that this material was substantially $CaO.TiO_2$, a small amount of anatase (less than 5%) possibly being present. This material was further processed in accordance with Example 1, the initial amount of sulfuric acid in the digestion being increased to about 90% of the stoichiometrical and 10% additional acid later added to insure complete reaction of the calcium titanate. The titanate was added slowly to the sulfuric acid with cooling to prevent overheating. The digestion cake was dissolved and the resulting titanium sulfate solution processed as in Example 1. Six hours of boiling were required to precipitate titanium hydrolysate, due to the high $H_2SO_4$ content. A rutile pigment of good quality was obtained on seeding and calcining.

We claim:

1. As a method of producing highly refined, purified titania hydrolysate substantially free of phosphatic impurities from relatively pure, washed titania hydrolysate containing phosphatic, iron, vanadium and chromium impurities in total amount less than 1% by weight calculated on the $TiO_2$ equivalent of said hydrolysate, wherein said impurities are converted into alkali-solubilized and acid-solubilized forms and are removed by washing with water, the improved method which comprises (1) converting said titania hydrolysate into an insoluble metal titanate and said alkali-solubilizable impurities including phosphatic impurities into water-soluble derivatives thereof, by reacting said hydrolysate with a reactive alkali compound capable of so-reacting therewith, at an elevated temperature until said reactions are substantially complete; (2) separating the insoluble metal titanate from the water-soluble constituents of the reaction mixture so obtained, including the phosphatic and other alkali-solubilized impurities thereof, by washing said mixture with water; (3) digesting the so-purified metal titanate with concentrated sulfuric acid to form soluble titanium sulfate and convert the acid-solubilizable impurities into water-soluble derivatives thereof; (4) forming an aqueous solution of the titanium sulfate so obtained; (5) filtering the titanium sulfate solution to remove impurities which are neither alkali-solubilizable nor acid-solubilizable and any insoluble by-products; (6) hydrolyzing said titanium sulfate, in said purified aqueous solution to form insoluble titania hydrolysate; and (7) separating the insoluble titania hydrolysate from the acid and acid-solubilized impurities by filtering and washing with water; the refined, purified titania hydrolysate so obtained being substantially free of phosphatic impurities and other deleterious impurities and being capable of conversion into titanium dioxide pigments having excellent brilliance and high-tintorial power.

2. As a method of producing highly refined, purified titania hydrolysate substantially free of phosphatic impurities from relatively pure, washed titania hydrolysate containing phosphatic, iron, vanadium and chromium impurities in total amount less than 1% by weight calculated on the $TiO_2$ equivalent of said hydrolysate wherein said impurities are converted into alkali-solubilized and acid-solubilized compounds and removed by washing with water, the improved method which comprises (1) reacting said titania hydrolysate with sodium hydroxide in an amount sufficient to convert the alkali-solubilizable impurities including phosphatic impurities into water-soluble derivatives thereof and to convert the titania hydrolysate into water-insoluble sodium titanate containing $Na_2O$ and $TiO_2$ in molar ratios between $Na_2O·3TiO_2$ and $Na_2·5TiO_2$; (2) separating said insoluble sodium titanate from the water-soluble constituents of the reaction mixture, including the phosphatic impurities and other alkali-solubilized impurities, by washing said sodium titanate with water; (3) digesting the washed sodium titanate with concentrated sulfuric acid to convert said sodium titanate into soluble titanium sulfate and to convert the acid-solubilizable impurities, including the metal impurities, into water-soluble derivatives thereof; (4) forming an aqueous solution of the titanium sulfates so obtained; (5) hydrolyzing the titanium sulfate in said aqueous solution to insoluble titania hydrolysate; and (6) separating said acid-solubilized impurities from the insoluble titania hydrolysate so obtained by washing said hydrolysate with water.

3. As a method of producing highly refined, purified titania hydrolysate substantially free of phosphatic impurities from relatively pure, washed titania hydrolysate containing phosphatic, iron, vanadium and chromium impurities in total amount less than 1% by weight calculated on the TiO₂ equivalent of said hydrolysate wherein said impurities are converted into alkali-solubilized and acid-solubilized compounds and are removed in such soluble forms by washing with water, the improved method which comprises (1) blending said titania hydrolysate with an alkali selected from the group consisting of sodium, potassium, calcium and magnesium alkalis and capable of reacting with said titania hydrolysate to convert it into an insoluble metal titanate and with said impurities to form water-soluble derivatives thereof, in an amount sufficient to produce a mixture in which the molar equivalence ratio of said hydrolysate as TiO₂ to said alkali is between 1:1 and 8:1; (2) calcining said blended mixture at an elevated temperature between 900° C. and 1400° C. sufficient to convert the titania hydroylsate into water-insoluble metal titanate and the alkali-solubilizable impurities into water-soluble derivatives thereof; (3) pulverizing the calcined mixture of insoluble metal titanate and solubilized impurities so obtained; (4) washing the pulverized mixture with water to remove the alkali-solubilized impurities, including the phosphatic impurities, therefrom; (5) digesting the so-purified metal titanate with sufficient concentrated sulfuric acid to convert the metal titanate into soluble titanium sulfates and to solubilize the acid-solubilizable impurities; (6) forming an aqueous solution of the titanium sulfates so obtained; (7) filtering the aqueous solution of titanium sulfate to remove any insoluble matter therefrom; (8) hydrolyzing the solution of titanium sulfate to insoluble titania hydrolysate; (9) washing the aqueous hydrolysate to separate the insoluble titania hydrolysate from the acid and acid-solubilized impurities; and (10) recovering the purified titania hydrolysate so obtained.

4. A method of purifying a washed titania hydrolysate containing a minor proportion of alkali and acid-solubilizable impurities including iron, vanadium, chromium, manganese and phosphatic impurities, which comprises blending said hydrolysate with a metal titanate forming calcium alkali, the molar equivalence ratio of said hydrolysate as TiO₂ to said alkali being between 1:1 and 8:1; calcining the blend to form a mixture of calcium sulfate and a calcium titanate; pulverizing said mixture; washing said pulverized mixture to remove alkali-solubilizable impurities therefrom; digesting the calcium titanate in said mixture to a titanium sulfate; forming an aqueous solution of said titanium sulfate; filtering said solution; hydrolyzing said titanium sulfate to insoluble titania hydrolysate; and washing said hydrolysate to remove acid-solubilizable impurities therefrom.

5. A method according to claim 4 wherein the mixture is calcined at about 1200° C. to 1400° C. for about two hours.

6. A method according to claim 5 wherein the molar equivalence ratio is between about 3:1 and 5:1.

7. A method according to claim 6 wherein the calcium alkali is calcium hydroxide.

8. As a method of producing highly refined, purified titania hydrolysate substantially free of phosphatic impurities from relatively pure, washed titania hydrolysate, containing phosphatic, iron, vanadium, and chromium impurities in total amount less than 1% by weight calculated on the TiO₂ equivalent of said hydrolysate wherein said impurities are converted into alkali-soluble and acid-soluble compounds and are removed in such soluble forms by washing with water, and of converting the so-purified titania hydrolysate into improved titanium dioxide pigments, the improved method which comprises (1) mixing said latter contaminated hydrolysate with an alkali selected from the group consisting of sodium, potassium, calcium and magnesium alkalis and capable of reacting with said hydrolysate to convert it into an insoluble metal titanate and with said impurities to convert them into water-soluble derivatives thereof, in a molar equivalence ratio of said hydrolysate as TiO₂ to said alkali of between 1:1 and 8:1; (2) heating said mixture to effect said reactions and convert said titania hydrolysate into a water-insoluble metal titanate, said heating being continued until said reactions are substantially complete and the alkali-solubilizable impurities are so solubilized; (3) washing the insoluble metal titanate with water to remove the so solubilized impurities, including the phosphatic impurities, therefrom; (4) digesting the so purified metal titanate with concentrated sulfuric acid at elevated temperature to convert the titanate into a soluble titanium sulfate; (5) forming an aqueous solution of the said titanium sulfates so obtained; (6) hydrolyzing said titanium sulfates to titania hydrolysate; (7) washing said hydrolysate with water to remove the acid and acid-solubilized impurities therefrom; and (8) calcining the so-purified hydrolysate to yield a titanium dioxide pigment.

9. A method of preparing a titanium dioxide pigment from a washed titania hydrolysate containing a minor portion of alkali and acid-solubilizing impurities, including iron, vanadium, chromium, manganese and phosphatic impurities, which comprises (1) mixing said hydrolysate with a metal titanate forming alkali selected from the group consisting of sodium, potassium, calcium and magnesium alkalis the molar equivalence ratio of said hydrolysate as TiO₂ to said alkali being between 1:1 and 8:1; (2) heating said mixture until solubilization of the alkali-solubilizable impurities and formation of an insoluble metal titanate by reaction of said hydrolysate with said alkali, are substantially complete; (3) washing said titanate to remove alkali-solubilized impurities therefrom; (4) digesting said titanate with concentrated sulfuric acid, the amount of sulfuric acid being equivalent to 70% to 100% of the titanate as $Ti(SO_4)_2$; (5) forming an aqueous solution of said titanium sulfate; (6) hydrolyzing said titanium sulfate to titania hydrolysate; (7) washing said hydrolysate to remove acid-solubilized impurities therefrom; and (8) calcining said purified hydrolysate in the presence of a preformed rutile seed at a temperature of about 900° C. to form rutile titanium dioxide pigment.

10. A method of preparing a titanium dioxide pigment from a washed titania hydrolysate containing a minor proportion of alkali- and acid-solubilizable impurities, including iron, vanadium, chromium, manganese, and phosphatic impurities, which comprises (1) blending said hydrolysate with sodium hydroxide in the molar equivalence ratio of said hydrolysate as TiO₂ to said hydroxide of between 3:1 and 5:1; (2) calcining said mixture at about 900° C. for about one hour until solubilization of the alkali-solubilizable impurities and formation of an insoluble sodium titanate by reaction of said hydrolysate with said sodium hydroxide are substantially complete; (3) washing said titanate to remove alkali-solubilized impurities, including said phosphatic impurities, therefrom; (4) digesting said washed, calcined titanate with concentrated sulfuric acid, the amount of sulfuric acid being equivalent to 70% to 100% of the titanate as $Ti(SO_4)_2$; (5) forming an aqueous solution of said titanium sulfate; (6) hydrolyzing said titanium sulfate to titania hydrolysate; (7) washing said hydrolysate to remove acid-solubilized impurities therefrom; (8) and calcining said purified hydrolysate to yield a titanium dioxide pigment.

11. A method of purifying a washed titania hydrolysate containing a minor proportion of alkali- and acid-solubilizable impurities including iron, vanadium, chromium, manganese, and phosphatic impurities, which comprises (1) slurrying said hydrolysate with sodium hydroxide in the proportion of about one and one-half parts by weight per part by weight of the TiO₂ equivalent of said hydrolysate; (2) heating said slurry to about 90° C. for about two hours; (3) filtering the reaction product and washing the filter cake to remove alkali-solubilized impurities therefrom; (4) calcining the washed material at about 900° C. for about one hour until formation of an insoluble sodium titanate is substantially complete; (5) washing said calcined titanate to remove alkali-solubilized impurities including phosphatic impurities therefrom; (6) digesting said sodium titanate to a titanium sulfate with concentrated sulfuric acid; (7) forming an aqueous solution of said titanium sulfate; (8) hydrolyzing said titanium sulfate to insoluble titania hydrolysate; and (9) washing said hydrolysate to remove acid-solubilized impurities therefrom.

12. A method of purifying a washed titania hydrolysate containing a minor proportion of alkali- and acid-solubilizable impurities including iron, vanadium, chromium, manganese and phosphatic impurities, which comprises (1) blending said hydrolysate with sodium hydroxide to form a mixture in which the molar equivalence ratio of said hydrolysate as $TiO_2$ to said hydroxide is between about 3:1 and 5:1; (2) calcining said mixture to form a sodium titanate and convert a part of said impurities into alkali-solubilized compounds; (3) pulverizing the calcined sodium titanate mixture so obtained; (4) washing the pulverized material to remove alkali-solubilized impurities therefrom, including phosphatic impurities; (5) digesting the so-purified sodium titanate to a titanium sulfate with concentrated sulfuric acid; (6) forming an aqueous solution of said titanium sulfate; (7) hydrolyzing said titanium sulfate to insoluble titania hydrolysate; and (8) washing said hydrolysate to remove acid-solubilized impurities therefrom.

13. A method according to claim 12 wherein the mixture is calcined at about 900° C. for about one hour.

References Cited in the file of this patent

UNITED STATES PATENTS

| | | |
|---|---|---|
| 1,361,866 | Jebsen | Dec. 14, 1920 |
| 1,501,587 | Doremus | July 15, 1924 |
| 1,766,592 | Blumenfeld | June 24, 1930 |
| 1,793,501 | Lubowsky | Feb. 24, 1931 |
| 1,947,226 | Richter | Feb. 13, 1934 |
| 1,978,228 | Saklatwalla | Oct. 23, 1934 |
| 2,078,279 | Richter | Apr. 27, 1937 |
| 2,193,559 | Keats | Mar. 12, 1940 |
| 2,269,139 | Booge | Jan. 6, 1942 |
| 2,433,597 | Cauwenberg | Dec. 30, 1947 |
| 2,494,492 | Ross | Jan. 10, 1950 |
| 2,503,692 | Tanner | Apr. 11, 1950 |
| 2,507,729 | McKinney | May 16, 1950 |
| 2,516,548 | Cauwenberg | July 25, 1950 |

OTHER REFERENCES

"Titanium," by Jelks Barksdale, 1949 ed., page 98, The Ronald Press Co., New York.